(12) United States Patent
Tada

(10) Patent No.: US 10,626,911 B1
(45) Date of Patent: Apr. 21, 2020

(54) CONNECTING ROD

(71) Applicant: TOYOTA JIDOSHA KABUSHIKI KAISHA, Toyota-shi, Aichi-ken (JP)

(72) Inventor: Hiroshi Tada, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/543,697

(22) Filed: Aug. 19, 2019

(30) Foreign Application Priority Data

Oct. 18, 2018 (JP) .................. 2018-196832

(51) Int. Cl.
*F16C 7/02* (2006.01)

(52) U.S. Cl.
CPC .................. *F16C 7/023* (2013.01)

(58) Field of Classification Search
CPC ...................................................... F16C 7/023
See application file for complete search history.

(56) References Cited

U.S. PATENT DOCUMENTS

| | | | | |
|---|---|---|---|---|
| 4,422,348 A * | 12/1983 | Campbell | ............... | F16C 9/04 403/344 |
| 5,524,507 A * | 6/1996 | Olmr | ............... | F16C 7/023 29/888.09 |
| 5,905,939 A * | 5/1999 | Ishijima | ............... | B22F 5/003 419/28 |
| 6,027,784 A * | 2/2000 | Taguchi | ............... | F16C 7/023 428/131 |
| 7,703,431 B2 * | 4/2010 | Genter | ............... | F02F 7/00 123/197.3 |
| 2014/0174400 A1 * | 6/2014 | Dunbar | ............... | F16C 7/023 123/197.3 |
| 2018/0320730 A1 * | 11/2018 | Bussieres | ............... | F16C 7/023 |

FOREIGN PATENT DOCUMENTS

| | | | | |
|---|---|---|---|---|
| EP | 1971453 B1 * | 5/2017 | ............. | F16C 7/023 |
| JP | H11-051037 A | 2/1999 | | |
| JP | 2009-127696 A | 6/2009 | | |

* cited by examiner

*Primary Examiner* — Vicky A Johnson
(74) *Attorney, Agent, or Firm* — Oliff PLC

(57) ABSTRACT

A connecting rod of an example in the present disclosure is divided into a rod body and a cap at an oblique division at a large end, the rod body and the cap fastened by bolts. The connecting rod includes a joining plane and first and second restricting parts. The joining plane is a flat joining surface parallel to the division surface of the large end and is formed on at least one of two abutting portions on which the rod body and the cap join. The first and second restricting parts restrict lateral deviations of the rod body in first and second directions with respect to the cap, respectively. The first and second directions are opposite directions. Each of the first and second restricting parts restricts the lateral deviations by a single set of first or second opposing surface provided between the rod body and the cap.

4 Claims, 8 Drawing Sheets

CONNECTING ROD

CROSS-REFERENCE TO RELATED APPLICATION

The present application claims priority under 35 U.S.C. § 119 to Japanese Patent Application No. 2018-196832, filed Oct. 18, 2018. The contents of this application are incorporated herein by reference in their entirety.

BACKGROUND

Field

The present disclosure relates to a connecting rod which connects a piston and a crank pin in an internal combustion engine.

Background

For example, as disclosed in JP 2009-127696 A, a connecting rod which is divided into a rod body and a cap at a large end in an oblique division is known. In the connecting rod disclosed in JP 2009-127696 A, the rod body and the cap abut each other at two points. At the two points, the joining surfaces of the rod body abut the joining surfaces of the cap.

The joining surface on the side closer to the small end of the rod body and the joining surface on the side farther from the small end of the cap are formed in a conical shape which is concave and narrows toward the bottom side. On the other hand, the joining surface on the side closer to the small end of the cap and the joining surface on the side farther from the small end of the rod body are formed in a conical surface shape which is convex and tapered toward the top side. The joining surface having concave shape and the joining surface having the convex shape are engaged to each other, and a bolt is penetrated into a bolt hole formed in each joining surfaces, thereby the rod body and the cap are fastened by the bolt.

In the connecting rod disclosed in JP 2009-127696 A, lateral deviation of the rod body with respect to the cap is suppressed by engaging the joining surfaces having concave shape and the joining surfaces having convex shape at the two abutting portions. If the dimensional accuracy of the rod body and the cap match, the entire surfaces of concave portions and the entire surfaces of convex portions may closely abut at both of the two abutting portions.

Actually, some errors occur in the dimensional accuracy of the rod body and the cap. Therefore, when the joining surface having concave shape and the joining surface having convex shape are fitted to each other at the two abutting portions, the concave portions and the convex portions abut on a part of joining surfaces, thereby attrition may progress at the abutting part. Attrition of the joining surface causes loosening of the bolt and causes lateral deviation of the rod body with respect to the cap. The lateral deviation of the rod body with respect to the cap causes an increase in the bearing clearance and an increase in the amount of oil leakage.

SUMMARY

The present disclosure has been conceived in consideration of the above described problem, and an object of an example in the present disclosure is to provide a connecting rod which is divided into a rod body and a cap at a large end in an oblique division, and in which attrition on the division surface and lateral deviation of the rod body with respect to the cap are suppressed.

A connecting rod according to an example in the present disclosure is divided into a rod body and a cap at an oblique division at a large end. The rod body and the cap are fastened by a bolt. The connecting rod includes at least one pair of joining planes, a first restricting part, and a second restricting part. The joining planes are flat joining surfaces parallel to the division surface of the large end and are formed on at least one of two abutting portions on which the rod body and the cap join. The first restricting part is configured to restrict lateral deviation of the rod body in a first direction with respect to the cap by a single set of first opposing surfaces provided between the rod body and the cap. The second restricting part is configured to restrict lateral deviation of the rod body in a second direction opposite to the first direction with respect to the cap by a single set of second opposing surfaces provided between the rod body and the cap.

According to the above-described configuration, the rod body and the cap are closely fitted to each other on the pair of the joining planes formed on at least one of the abutting portions. The lateral deviation in the first direction is suppressed by the first restricting part. The lateral deviation in the second direction is suppressed by the second restricting part. Attrition of the opposing surfaces in each restricting parts causes the looseness of the bolt to enlarge the lateral deviation. However, according to the above configuration, since the lateral deviation in each direction is restricted by not a plurality of sets but by a single set of opposing surfaces, attrition of the opposing surfaces is suppressed by closely joining the opposing surfaces.

The connecting rod according to one aspect of the present disclosure, on pair of the joining planes may be formed on one of the two abutting portions. Also, the other of the two abutting portions may comprise a convex portion and a concave portion fitted to the convex portion. In this case, the convex portion is formed on one of the rod body and the cap whereas the concave portion is formed on the other of the rod body and the cap. In this case, one of the first restricting part and the second restricting part may comprise the side surface on the first direction side of the convex portion and the side surface on the first direction side of the concave portion. Also, the other of the first restricting part and the second restricting part may comprise the side surface on of the second direction side of the convex portion and the side surface on the second direction side of the concave portion.

According to the above configuration, lateral deviation of the rod body with respect to the cap is suppressed by fitting the convex portion and the concave portion formed in one of the two abutting portions. In addition, the other of the two abutting portions is not a convex and a concave portions but a pair of the joining planes. Therefore, lateral deviation due to the error of processing accuracy of the components which occurred when the convex portion and the concave portion are aligned is absorbed in the joining planes. Therefore, it may be possible to suppress distortion which occurs in the first direction or the second direction when the rod body and the cap are fastened by the bolt.

The convex portion may be formed in a mountain shape having a first mountain slope inclined in the first direction and a second mountain slope inclined in the second direction from the top portion thereof. The concave portion may be formed in a valley shape having a first valley slope inclined in the first direction and a second valley slope inclined in the second direction from the bottom thereof. In this case, one of the first restricting part and the second restricting part may comprise the first mountain slope and the first valley slope, and the second restricting part and the other of the first restricting part and the second restricting part may comprise the second mountain slope and the second valley slope.

In the above-described configuration, the first mountain slope is formed as the side surface on the first direction side in which the crest-shaped convex portion is formed, and the second mountain slope is formed as the side surface on the second direction side. In addition, a first valley slope is formed as a side surface on the first direction side for forming the valley-shaped concave portion, and a second valley slope is formed as a side surface on the second direction side. Since the first mountain slope and the first valley slope abut and the second mountain slope and the second valley slope abut, the convex portion and the concave portion are restrained from each other, and lateral deviation of the rod body with respect to the cap in the first direction and the second direction is suppressed.

Bolt holes into which the bolt penetrate may be drilled through the top of the convex and the bottom of the concave. According to this, the surface pressure between the convex portion and the concave portion applied when the rod body and the cap are fastened by bolts may be uniformized between on the first direction side and the second direction side.

Of the two abutting portions, the abutting portion on the side to which the rod body is inclined with respect to the division surface in the large end may comprise the convex portion and the concave portion. In other words, a pair of joining planes may be formed on the abutting portion on the opposite side to the side to which the rod body is inclined. According to this, when a connecting rod is pulled to a crank pin by the rotation of a crank shaft, even if lateral deviation occurs at the abutting portion on the side on which the joining planes is formed, the rod body moves in the direction in contact with the crank pin. Therefore, lateral deviation is suppressed by contact with the crank pin.

According to another aspect of the connecting rod of the example of the present disclosure, pairs of the joining planes may be formed on both of the two abutting portions. One of the rod body and the cap may be provided with a pair of claw portions which sandwich the other of the rod body and the cap from both outer sides of the two abutting portions. In this case, one of the first restricting part and the second restricting part may comprise a pressing surface of the claw portion on the first direction side of the pair of claw portions and a pressed surface of the rod body or the cap which is pressed by the pressing surface of the claw portion on the first direction side. Also, the other of the first restricting part and the second restricting part may comprise a pressing surface of the claw portion on the second direction side of the pair of claw portions and a pressed surface of the rod body or the cap which is pressed by the pressing surface of the claw portion on the second direction side.

According to the above configuration, lateral deviation of the rod body with respect to the cap is suppressed by sandwiching the rod body or the cap by the pair of claw portions from both outer sides of the two abutting portions. In addition, since the two abutting portions are both joining planes, the rod body and the cap may be brought into close contact with each other at the division surface of the large end.

As described above, according to the connecting rod of the example of the present disclosure, it is possible to suppress attrition on the division surface and lateral deviation of the rod body with respect to the cap.

DESCRIPTION OF EMBODIMENTS

Embodiments of the present disclosure will be described below with reference to the drawings.

First Embodiment

Figure 1:
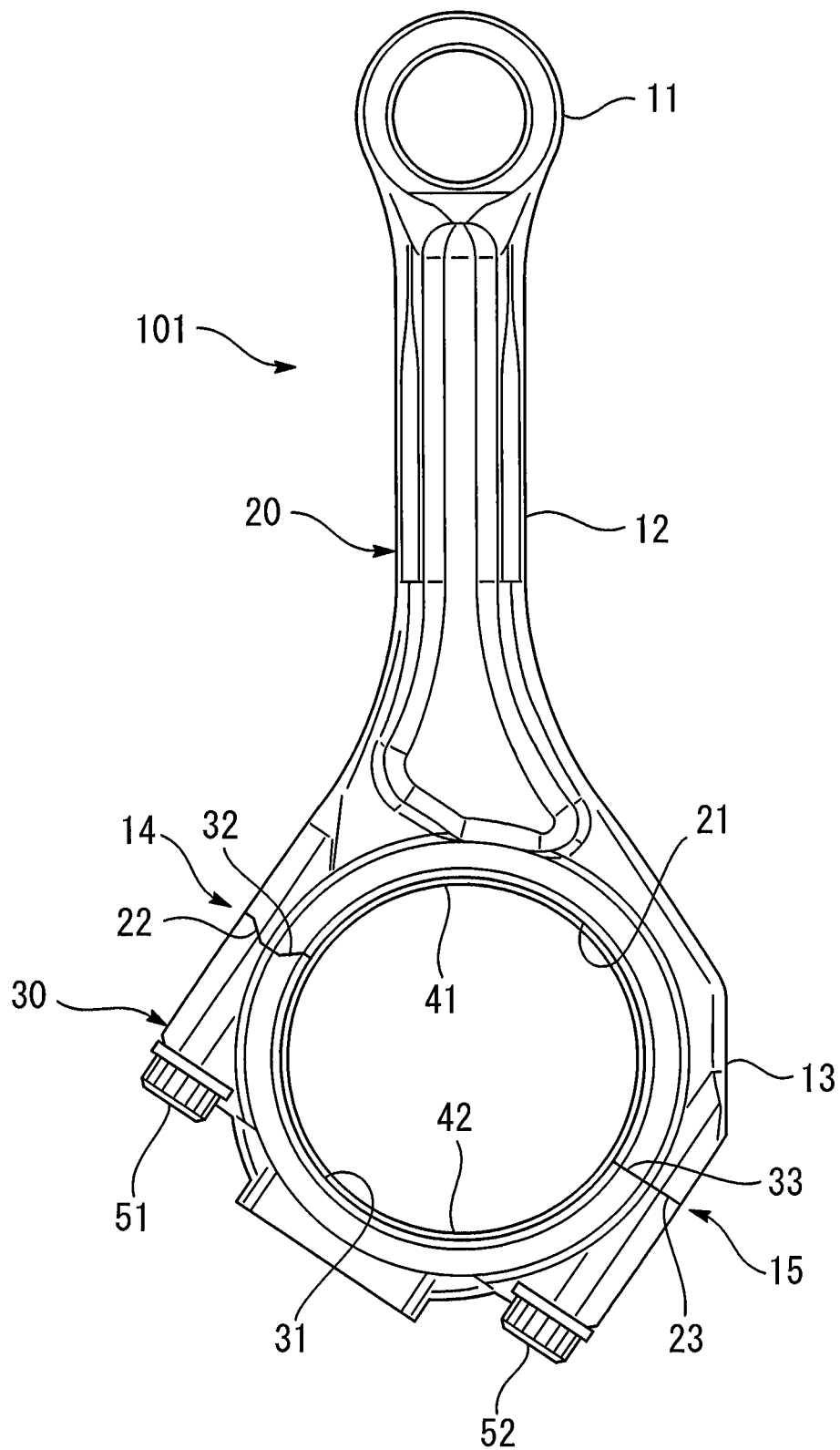
FIG. 1 is a front view illustrating a connecting rod according to a first embodiment of the present disclosure.

First embodiment of the present disclosure will be described. FIG. 1 is a front view illustrating a connecting rod 101 according to the first embodiment of the present disclosure. The connecting rod 101 connects a piston and a crank pin in an internal combustion engine. As illustrated in FIG. 1, the connecting rod 101 has a small end 11, a large end 13 and a connecting member 12. Both of the ends 11 and 13 have annular shapes. The small end 11 serves as a bearing portion of the piston pin. The large end 13 serves as a bearing portion of the crank pin. The connecting member 12 having a rod shape connects the small end 11 and the large end 13.

The connecting rod 101 is divided into a rod body 20 and a cap 30 in an oblique division at the large end 13. However, the rod body 20 and the cap 30 are manufactured not by cracking but by processing separately. The rod body 20 and the cap 30 are fastened by bolts 51 and 52. The rod body 20 includes a small end 11, a connecting member 12 and a part of the large end 13. The remaining part of the divided large end 13 is a cap 30. Semi-circles 21 and 31 serving as a bearing portion of the crank pin are formed in a portion corresponding to the large end 13 of the rod body 20 and the cap 30, respectively. Divided bearings 41 and 42 are set in Semi-circles 21 and 31, respectively.

The rod body 20 and the cap 30 abut at two abutting portions 14 and 15. The surface including the two abutting portions 14 and 15 is a division surface of the large end 13. Bolt holes (not shown) are formed in the connecting rod 101 so as to extend from the cap 30 to the rod body 20 through the abutting portions 14 and 15. FIG. 1 illustrates a condition in which the bolts 51 and 52 penetrate into the bolt holes and the rod body 20 and the cap 30 are fastened at the abutting portions 14 and 15.

In one abutting portion 14 of the two abutting portions 14 and 15, more specifically, in the abutting portion 14 on the side to which the rod body 20 is inclined with respect to the division surface, a joining surface 22 of the rod body 20 abuts a joining surface 32 of the cap 30. As will be described later, the joining surface 22 is not flat but forms a convex portion as a whole, and the joining surface 32 is not flat but forms a concave portion as a whole. In the abutting portion 14, the convex portion of the joining surface 22 and the concave portion of the joining surface 32 are fitted. In the other abutting portion 15, a joining surface 23 of the rod body 20 abuts a joining surface 33 of the cap 30. The joining surfaces 23 and 33 are formed flat and in parallel with the division surface of the large end 13. In the abutting portion 15, the joining surface 23 and the joining surface 33 are in surface contact with each other. Hereinafter, these flat joining surface 23 and 33 are referred to as "joining planes".

Figure 2:
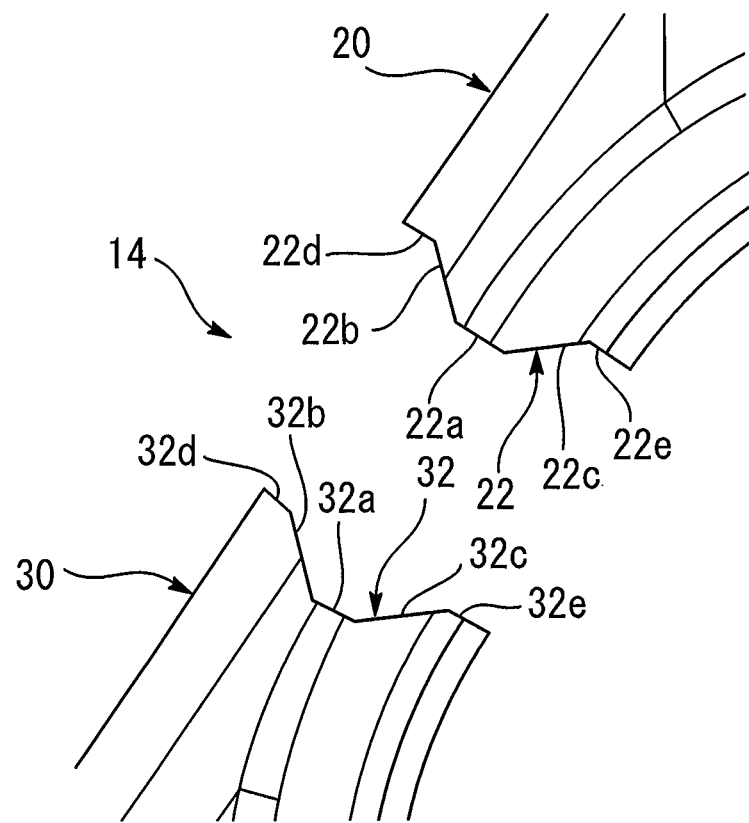
FIG. 2 is an enlarged view illustrating a separated state of an abutting portion according to first embodiment of the present disclosure.

Next, a detailed configuration of the abutting portion 14 will be described. FIG. 2 is an enlarged view illustrating a state in which the abutting portion 14 is separated, that is, a state in which the joining surface 22 of the rod body 20 and the joining surface 32 of the cap 30 are separated from each other. As shown in FIG. 2, the joining surface 22 of the rod body 20 includes a top portion 22a, a first mountain slope 22b, a second mountain slope 22c, and base portions 22d and 22e. As a whole, the joining surface 22 forms a mountain-shaped convex portion. The inclination angles of the first mountain slope 22b and the second mountain slope 22c may be the same or different. The joining surface 32 of the cap 30 includes a bottom portion 32a, a first valley slope 32b, a second valley slope 32c, and base portions 32d and 32e. As a whole, the joining surface 32 forms a valley-shaped concave portion. The inclination angle of the first valley slope 32b is the same as the inclination angle of the first mountain slope 22b. The inclination angle of the second valley slope 32c is the same as the inclination angle of the second mountain slope 22c.

Figure 3:
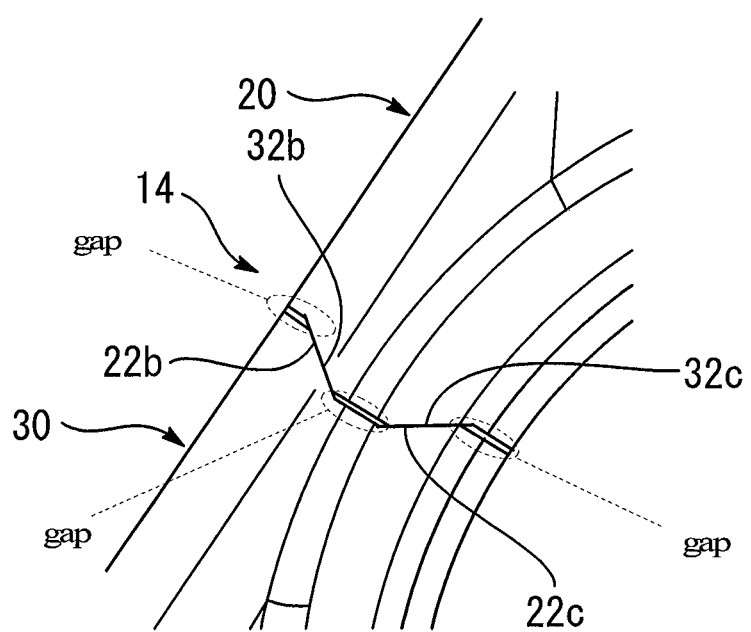
FIG. 3 is an enlarged view illustrating an abutting state of the abutting portion according to first embodiment of the present disclosure.

FIG. 3 is an enlarged view illustrating an abutting state of the abutting portion 14, that is, an abutting state of the joining surface 22 of the rod body 20 and the joining surface 32 of the cap 30. As shown in FIG. 3, the first mountain slope 22b and the first valley slope 32b constitute a pair of opposing surfaces. In the abutting state, the first mountain slope 22b and the first valley slope 32b are in surface contact with each other. The second mountain slope 22c and the second valley slope 32c constitute a pair of opposing surfaces. In the abutting state, the second mountain slope 22c and the second valley slope 32c are in surface contact with each other. A gap is formed between the top portion 22a and the bottom portion 32a and between the base portions 22d and 22e and the base portions 32d and 32e, respectively. That is, in the abutting portion 14, the joining surfaces 22 and 32 are in contact not at the entire surfaces, but only at the entire surfaces of the mountain slopes 22b and 22c on both sides and the valley slopes 32b and 32c on both sides.

Since the first mountain slope 22b and the first valley slope 32b are in surface contact with each other, the lateral deviation of the rod body 20 with respect to the cap 30 in the left direction in FIG. 3 is restricted. Hereinafter, the left direction, that is, the direction toward the side to which the rod body 20 is inclined with respect to the division surface is referred to as "the first direction". In the connecting rod 101, the opposing surfaces for restricting the lateral deviation in the first direction along the division surface are only the opposing surfaces composed of the first mountain slope 22b and the first valley slope 32b. Therefore, the first mountain slope 22b and the first valley slope 32b correspond to a first restricting part which restricts the lateral deviation of the rod body 20 in the first direction with respect to the cap 30 by a single set of first opposing surfaces provided between the rod body 20 and the cap 30.

Since the second mountain slope 22c and the second valley slope 32c are in surface contact with each other, the lateral deviation of the rod body 20 with respect to the cap 30 in the right direction in FIG. 3 is restricted. Hereinafter, the right direction is referred to as a "second direction". The second direction is the direction toward the side opposite to the first direction to which the rod body 20 is inclined with respect to the division surface. In the connecting rod 101, the opposing surface for restricting the lateral deviation in the second direction along the division surface are only the opposing surfaces composed of the second mountain slope 22c and the second valley slope 32c. Therefore, the second mountain slope 22c and the second valley slope 32c correspond to a second restricting part which restricts the lateral deviation of the rod body 20 in the second direction with respect to the cap 30 by a single set of second opposing surfaces provided between the rod body 20 and the cap 30.

Figure 4:
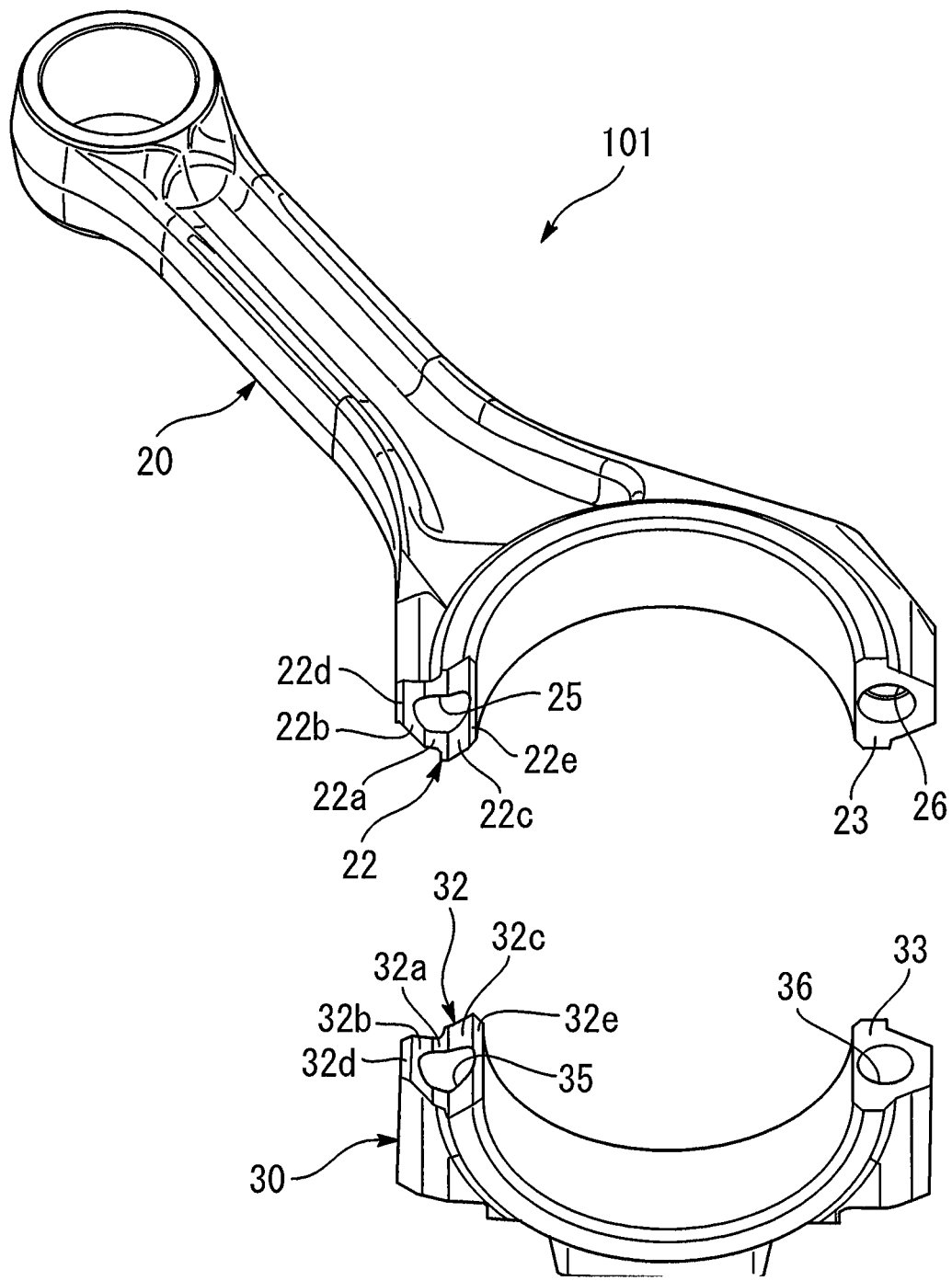
FIG. 4 is a perspective view illustrating a rod body and a cap according to the first embodiment of the present disclosure.

FIG. 4 is a perspective view illustrating the rod body 20 and the cap 30 in the separated state. As shown in FIG. 4, bolt holes 35 and 36 are formed in the two joining surfaces 32 and 33 of the cap 30, respectively. Bolt holes 25 and 26 connected to the bolt holes 35 and 36 are also formed in the two joining surfaces 22 and 23 of the rod body 20, respectively. The bolt hole 35 formed in the joining surface 32 of the cap 30 is opened so that the center of the bolt hole 35 passes through the bottom portion 32a. The bolt hole 25 formed in the joining surface 22 of the rod body 20 is formed so that the center of the bolt hole 25 passes through the top portion 22a. By opening the bolt holes 25 and 35 in this manner, a difference between the surface pressure acting on the opposing surfaces composed of the first mountain slope 22b and the first valley slope 32b and the surface pressure acting on the opposing surfaces composed of the second mountain slope 22c and the second valley slope 32c is decreased.

Figure 5:
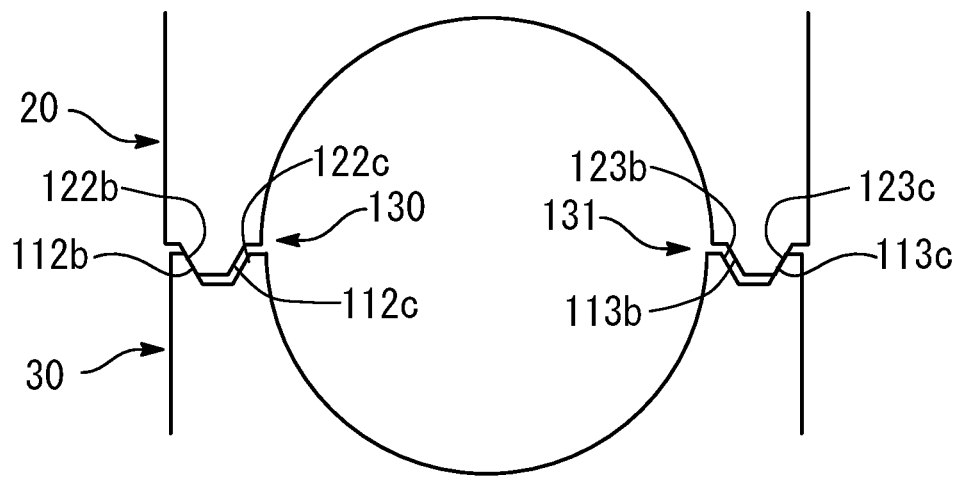
FIG. 5 is a view illustrating a construction of an abutting portion according to a first comparative example.

In order to clarify the effect of the connecting rod 101 according to the present embodiment, two comparative examples of configuration of abutting portions of connecting rods will be given. In the first comparative example shown in FIG. 5, on both two abutting portions 130,131 where a rod body 20 and a cap 30 are in contact, mountain-shaped convex portions and valley-shaped concave portions are formed. When there is no error in the dimensional accuracy of both the rod body 20 and the cap 30, the convex portions and the concave portions fit closely in both the abutting portions 130 and 131. However, if there is an error in the dimensional accuracy of at least one of the rod body 20 and the cap 30, the abutting portions may be limited to a part of the mountain slopes and the valley slopes. In the case of the first comparative example, the outer first mountain slope 112b and the first valley slope 122b are in contact with each other and the outer second mountain slope 113c and the second valley slope 123c are in contact with each other. However, the inner second mountain slope 112c and the second valley slope 122c do not abut, and the inner first mountain slope 113b and the first valley slope 123b do not abut.

Figure 6:
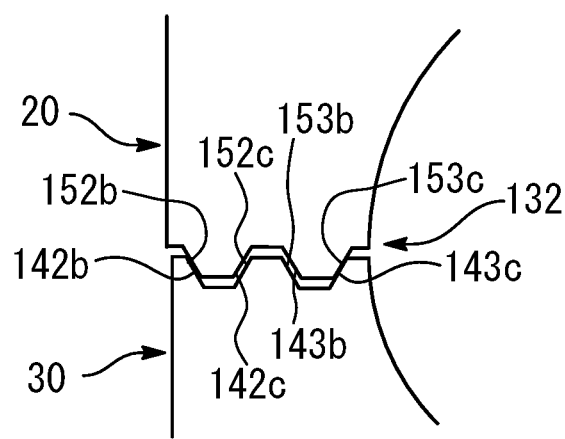
FIG. 6 is a view illustrating a construction of an abutting portion according to a second comparative example.

In the second comparative example shown in FIG. 6, two pairs of mountain-shaped convex portions and valley-shaped concave portions are formed in one abutting portion 132 at which a rod body 20 and a cap 30 abut. When there is no error in the dimensional accuracy of both the rod body 20 and the cap 30, the two sets of the convex portions and the concave portions fit closely. However, if there is an error in the dimensional accuracy of at least one of the rod body 20 and the cap 30, the abutting portion may be limited to a part of the mountain slopes and the valley slopes. In the case of the second comparative example, the first mountain slope 142b and the first valley slope 152b of the first set are in contact with each other, and the second mountain slope 143c and the second valley slope 153c of the second set are in contact with each other. However, second mountain slope 142c and the second valley slope 152c of the first set do not abut, and the first mountain slope 143b and the first valley slope 153b of the second set do not abut.

In the case of the above first and second comparative examples, only a part of the plurality of sets of opposing surfaces is in contact with each other. In this case, the shear stress at the abutting part of the opposing surfaces becomes higher than the provision value. As a result, attrition may progress at the abutting part. When the abutting part of the opposing surfaces is worn, a backlash occurs between the rod body 20 and the cap 30. This backlash loosens the bolt and causes the lateral deviation of the rod body 20 with respect to the cap 30. In addition, when all of the opposing surfaces are forcedly in contact with each other, axial force of the bolt reduces and the rod body 20 and the cap 30 may be distorted.

According to the connecting rod 101 of the present embodiment, the lateral deviation in the first direction is restricted not by a plurality of sets but by a single set of opposing surfaces (i.e., the first mountain slope 22b and the first valley slope 32b). Also, the lateral deviation in the second direction also restricted not by a plurality of sets but by a single set of opposing surfaces (i.e., the second mountain slope 22c and the second valley slope 32c). Therefore, the whole of the opposing surfaces closely abut with each other so that the attrition of the opposing surfaces is suppressed. In addition, one abutting portion 15 of the two abutting portions is a pair of the joining planes 23 and 33 instead of the convex portion and the concave portion. Therefore, the lateral deviation due to the error of processing accuracy of the components which occurred when the convex portion and the concave portion are aligned is absorbed in the joining planes 23 and 33. Therefore, it may be possible to suppress distortion in the first direction or the second direction which occurs when the rod body 20 and the cap 30 are fastened by the bolts 51 and 52.

In the connecting rod 101 according to the present embodiment, the joining planes 23 and 33 are formed in the abutting portion 15 on the opposite side to the side to which the rod body 20 is inclined with respect to the division surface of the large end 13. According to this, when the connecting rod 101 is pulled to the crank pin by the rotation of the crank shaft, even if lateral deviation occurs at the abutting portion 15 on the side where the joining planes 23 and 33 are formed, the rod body 20 moves in the direction in contact with the crank pin, and therefore lateral deviation is restricted by contact with the crank pin.

Figure 7:
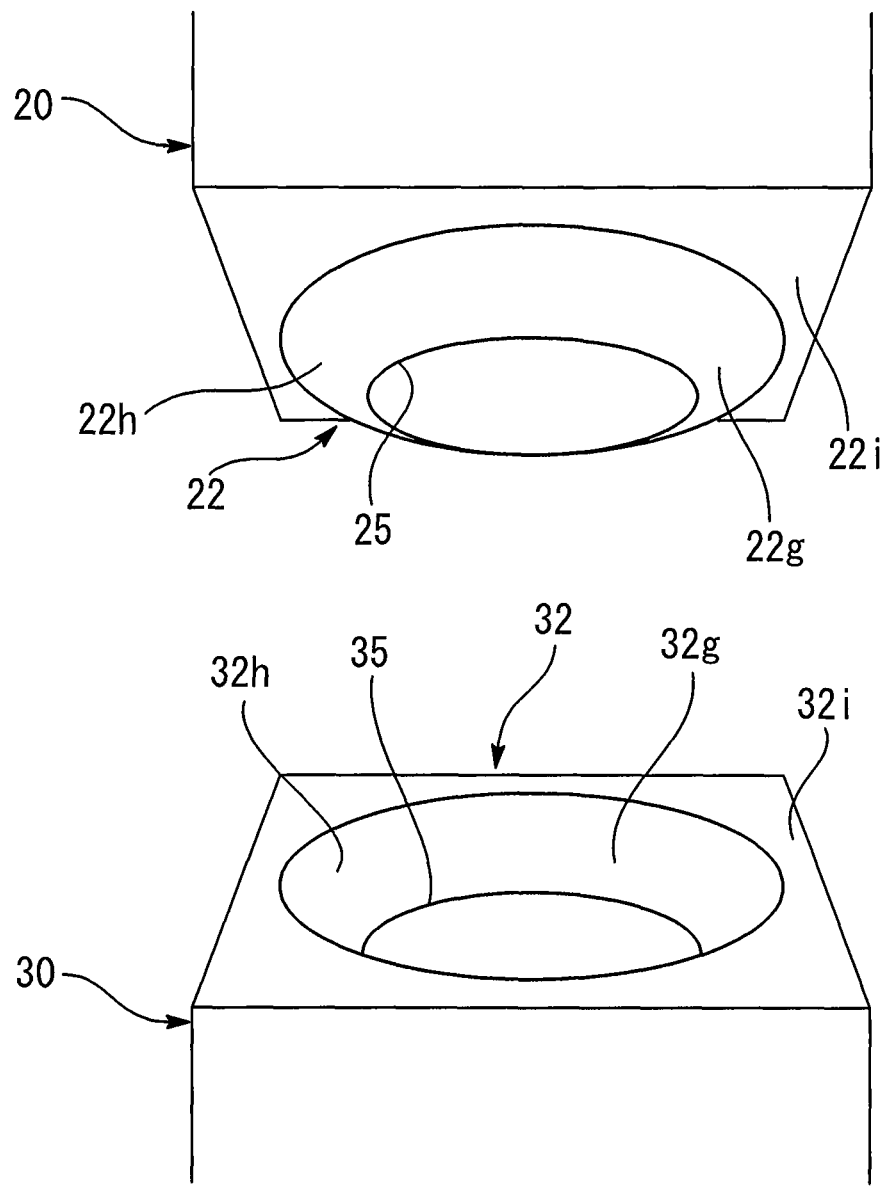
FIG. 7 is a view illustrating a construction of an abutting portion according to the other example of the first embodiment.

A modification of the connecting rod 101 according to the other example of the present embodiment will be exemplified. FIG. 7 is a diagram illustrating a construction of the abutting portion 14 of the connecting rod 101 according to the other example of the present embodiment. In this example, a convex portion is formed in a conical shape on the joining surface 22 of the rod body 20, and a concave portion is formed in a conical shape on the joining surface 32 of the cap 30. A bolt hole 25 is formed in the top portion of the conical convex portion, and a bolt hole 35 is also formed in the bottom portion of the conical concave portion. When the rod body 20 and the cap 30 are fastened by bolts (not shown), the weight surfaces 22h and 22g of the conical convex portion and the weight surfaces 32h and 32g of the conical concave portion are brought into contact with each other with remaining a gap between the base portions 22i and 32i of both the joining surfaces 22 and 32.

In the example shown in FIG. 7, the first restricting part for restricting lateral deviation of the rod body 20 with respect to the cap 30 in the first direction is constituted by the weight surface 22h of the conical convex portion on the first direction side (i.e., left direction in FIG. 7) and the weight surface 32h of the conical concave portion on the first direction side. The weight surface 22g of the conical convex portion on the second direction side (right direction in FIG. 7) and the weight surface 32g of the conical concave portion on the second direction side constitute the second restricting part for restricting the lateral deviation of the rod body 20 with respect to the cap 30 in the second direction.

As another example, the portions where the convex portion and the concave portion are formed may be reversed between the rod body 20 and the cap 30. That is, a concave portion may be formed in the rod body 20, and a convex portion may be formed in the cap 30. In the example shown in FIG. 7, the shapes of the convex portion and the concave portion formed on the joining surface may be pyramidal.

Second Embodiment

Figure 8:
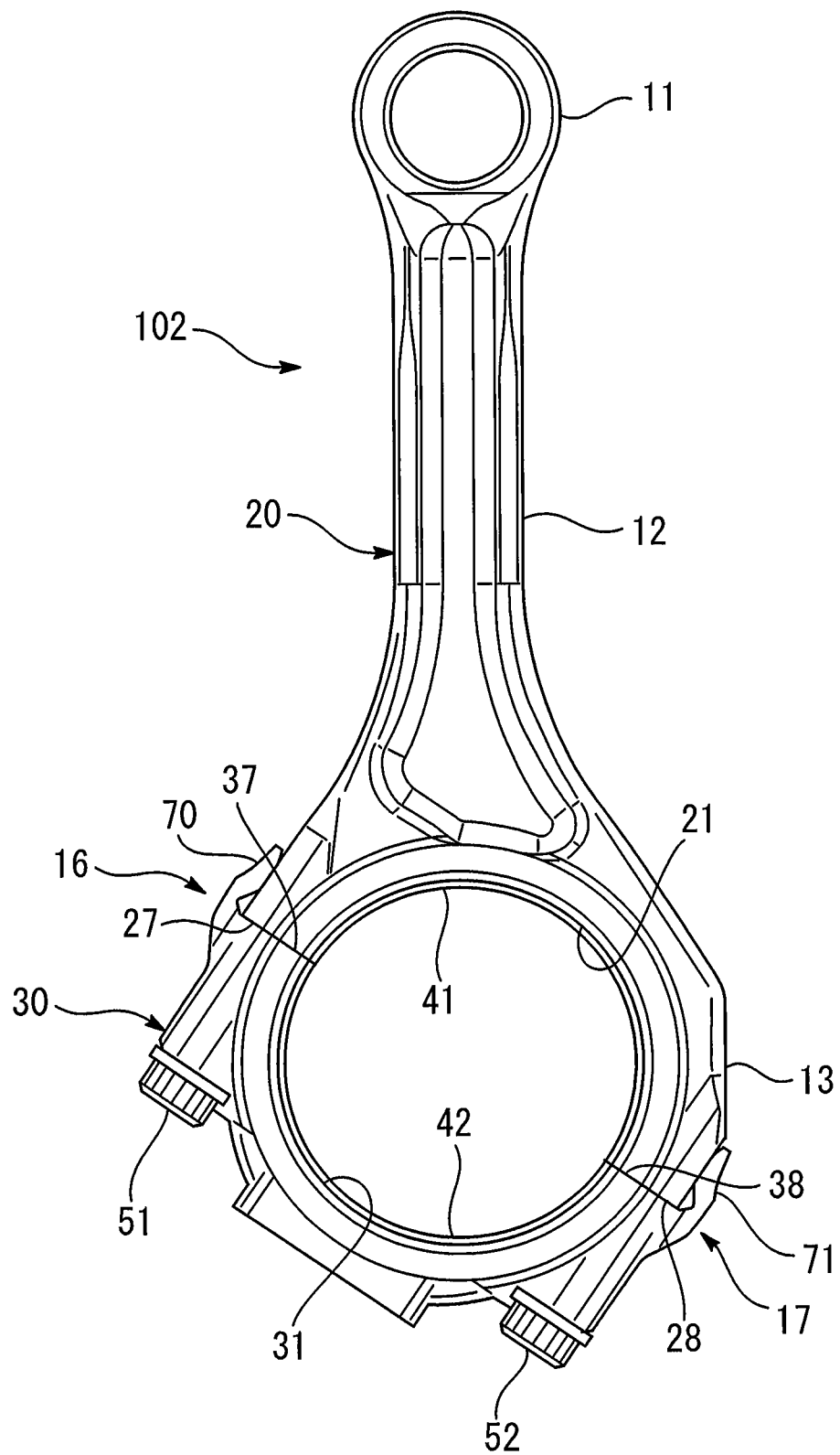
FIG. 8 is a front view illustrating a connecting rod according to a second embodiment of the present disclosure.

Second embodiment of the present disclosure will be described. FIG. 8 is a front view illustrating a connecting rod 102 according to the second embodiment of the present disclosure. As shown in FIG. 8, the connecting rod 102 has an small end 11, an annular large end 13 and a connecting member 12 similarly to the connecting rod 101 (reference FIG. 1) according to the first embodiment. Both of the ends 11 and 13 have annular shapes. The small end 11 serves as a bearing portion of the piston pin. The large end 13 serves as a bearing portion of the crank pin. The connecting member 12 having a rod shape connects the small end 11 and the large end 13. The connecting rod 102 is divided into a rod body 20 and a cap 30 at the large end 13 in an oblique division. In FIG. 8, the same reference numerals are used for elements same as or corresponding to those of the connecting rod 101 according to the first embodiment. In the following description, duplicate descriptions of these elements are omitted.

In the connecting rod 102 according to the present embodiment, a rod body 20 and a cap 30 abut at two abutting portions 16 and 17. In one (that is, abutting portion 16) of the two abutting portions 16 and 17, a joining plane 27 of the rod body 2Q and a joining plane 37 of the cap 30 are in surface contact with each other. At the other abutting portion 17, a joining plane 28 of the rod body 20 abuts a joining plane 38 of the cap 30. Each of the joining planes 27, 37, 28, and 38 is formed flat and in parallel with the division surface of the large end 13. In the vicinity of each of the abutting portions 16 and 17 of the cap 30, a pair of claw portions 70 and 71 for sandwiching the rod body 20 from both outer sides of the two abutting portions 16 and 17 are provided.

Figure 9:
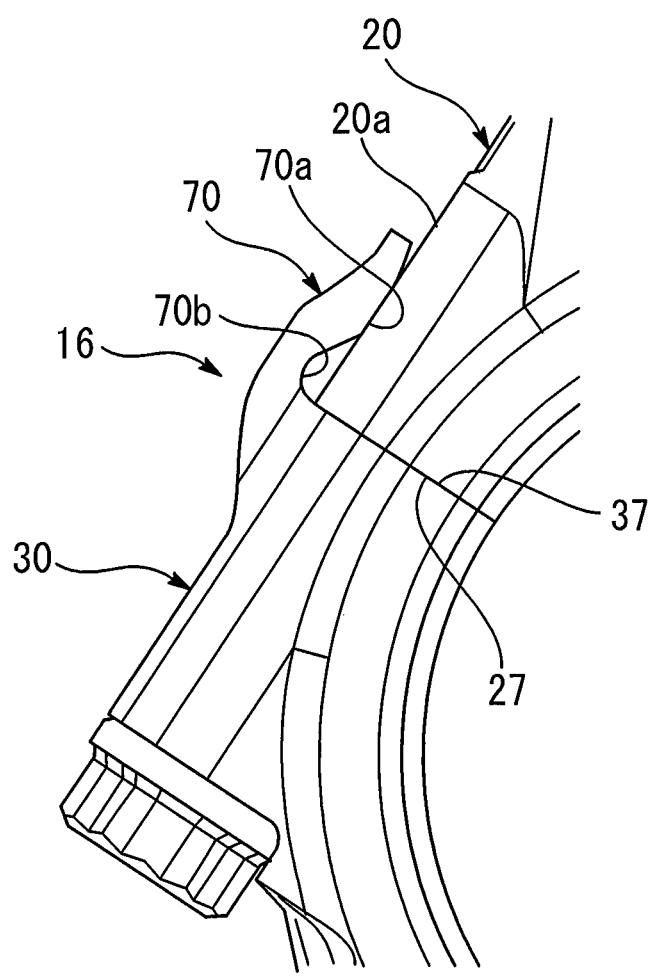
FIG. 9 is an enlarged view illustrating an abutting state of an abutting portion according to the second embodiment of the present disclosure.

A detailed configuration of the abutting portion 16 will be described. FIG. 9 is an enlarged view illustrating the abutting state of the abutting portion 16, that is, the abutting state of the joining surface 27 of the rod body 20 and the joining surface 37 of the cap 30. The abutting portion 16 is provided with a claw portion 70 on the first direction side of the pair of claw portions 70 and 71. As shown in FIG. 9, the claw portion 70 includes a pressing surface 70a which engages with the side surface 20a on the first direction side of the rod body 20, and a constriction portion 70b which is a portion having lower rigidity than other portions of the claw portion 70. The pressing surface 70a of the claw portion 70 and the side surface 20a of the rod body 20 constitute a pair of opposing surfaces. Hereinafter, a side surface of the rod body 20 constituting opposing surfaces is referred as a "pressed surface". In the abutting state, the pressing surface 70a and the pressed surface 20a are in surface contact with each other.

By the surface contact between the pressing surface 70a and the pressed surface 20a, lateral deviation of the rod body 20 with respect to the cap 30 in the left direction in FIG. 9 (that is, a direction toward the side to which the rod body 20 is inclined with respect to the division surface, hereinafter, referred to as a first direction) is restricted. In the connecting rod 102, the opposing surface for restricting the lateral deviation in the first direction along the division surface is only the opposing surface composed of the pressing surface 70a and the pressed surface 20a. Therefore, the pressing surface 70a and the pressed surface 20a correspond to a first restricting part which restricts the lateral deviation of the rod body 20 in the first direction with respect to the cap 30 by a single pair of first opposing surfaces provided between the rod body 20 and the cap 30.

Figure 10:
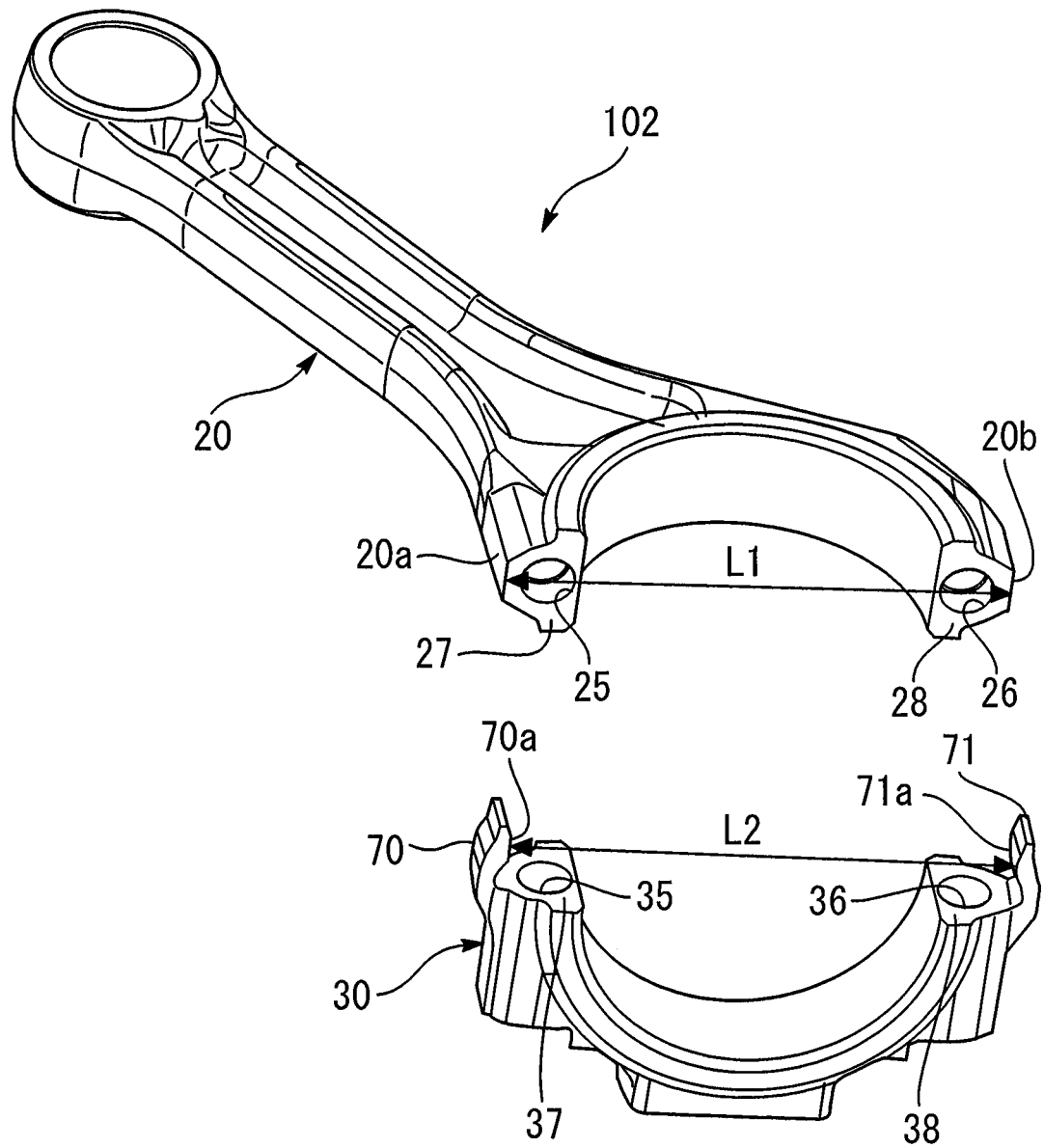
FIG. 10 is a perspective view illustrating a rod body and a cap according to the second embodiment of the present disclosure.

FIG. 10 is a perspective view illustrating the rod body 20 and the cap 30 in a separated state. In FIG. 10, a side surface 20b on the second direction side of the rod body 20 faces to the pressing surface 71a of the claw portion 71 on the second direction side. The pressing surface 71a of the claw portion 71 and the side surface 20b (that is, the pressed surface) of the rod body 20 constitute a pair of opposing surfaces. In the abutting state, the pressing surface 71a and the pressed surface 20b are in surface contact with each other. The pressing surface 71a and the pressed surface 20b correspond to a second restricting part which restrict lateral deviation of the rod body 20 in the second direction with respect to the cap 30 by a single pair of second opposing surfaces provided between the rod body 20 and the cap 30.

The rod body 20 and the cap 30 may be assembled so that no backlash in the direction of the lateral deviation occurs by pressing the pressed surfaces 20a and 20b with the pressing surfaces 70a and 71a. In order to suppress the backlash, the distance L2 from the pressing surface 70a to the pressing surface 71a in the cap 30 is the same as or smaller than the distance L1 from the pressed surface 20a to the pressed surface 20b in the rod body 20. In order to make the claw portions 70 and 71 elastic, the claw portions 70 and 71 are provided with constriction portions.

According to the connecting rod 102 of the present embodiment, the lateral deviation of the rod body 20 with respect to the cap 30 is suppressed by sandwiching the rod body 20 by the pair of claw portions 70 and 71 from both outer sides of the two abutting portions 16 and 17. In addition, since the two abutting portions 16 and 17 are both joining planes, the rod body 20 and the cap 30 may be brought into close contact with each other at the division surface of the large end 13. Further, in the first embodiment, when the rod body 20 attempts to shift laterally with respect to the cap 30, a force acts in a direction in which the mountain slopes 22b and 22c run up the valley slopes 32b and 32c, and the tensile stress of the bolts 51 and 52 increases. On the other hand, in the connecting rod 102 according to the present embodiment, since the lateral force is received by the claw portions 70 and 71, no load is applied to the bolts 51 and 52.

As the other example of the connecting rod 102 according to the other example of the present embodiment, the claw portions 70 and 71 may be provided in the rod body 20, and the cap 30 may be sandwiched between both outer sides of the two abutting portions 16 and 17.

What is claimed is:

1. A connecting rod which is divided into a rod body and a cap at a large end in an oblique division, the rod body and the cap being fastened by a bolt, the connecting rod comprising:
   an oblique division surface formed at the oblique division at the large end, the oblique division surface including two abutting portions on which the rod body and the cap join;
   a pair of joining planes parallel to the oblique division surface of the large end;
   a first restricting part which restricts lateral deviation of the rod body in a first direction with respect to the cap by a single set of first opposing surfaces provided between the rod body and the cap; and
   a second restraining part which restricts lateral deviation of the rod body in a second direction opposite to the first direction with respect to the cap by a single set of second opposing surfaces provided between the rod body and the cap, wherein
   the pair of joining planes is formed on surfaces of one of the two abutting portions,
   the other of the two abutting portions comprises a convex portion formed on one of the rod body and the cap, and a concave portion formed on the other of the rod body and the cap and fitted to the convex portion,
   one of the first restricting part and the second restricting part comprises a side surface on a first direction side of the convex portion and a side surface on a first direction side of the concave portion,
   the other of the first restricting part and the second restricting part comprises a side surface on a second direction side of the convex portion and a side surface on a second direction side of the concave portion, and
   of the two abutting portions, the abutting portion on a side towards which the rod body is inclined with respect to the oblique division surface comprises the convex portion and the concave portion.

2. The connecting rod according to claim 1, wherein
   the convex portion is formed in a mountain shape comprising a first mountain slope inclined from the top portion of the convex portion toward the first direction and a second mountain slope inclined from the top portion toward the second direction,
   the concave portion is formed in a valley shape comprising a first valley slope inclined from the bottom of the concave portion toward the first direction and a second valley slope inclined from the bottom toward the second direction,
   one of the first restricting part and the second restricting part comprises the first mountain slope and the first valley slope, and
   the other of the first restricting part and the second restricting part comprises the second mountain slope and the second valley slope.

3. The connecting rod according to claim 1, wherein bolt holes into which the bolt penetrate are formed in the top of the convex portion and the bottom of the concave portion.

4. A connecting rod which is divided into a rod body and a cap at a large end in an oblique division, the rod body and the cap being fastened by a bolt, the connecting rod comprising:
- an oblique division surface formed at the oblique division at the large end, the oblique division surface including two abutting portions on which the rod body and the cap join;
- a plurality of pairs of joining planes parallel to the oblique division surface of the large end;
- a first restricting part which restricts lateral deviation of the rod body in a first direction with respect to the cap by a single set of first opposing surfaces provided between the rod body and the cap; and
- a second restraining part which restricts lateral deviation of the rod body in a second direction opposite to the first direction with respect to the cap by a single set of second opposing surfaces provided between the rod body and the cap, wherein
- a pair of the plurality of pairs of the joining planes are formed on both surfaces of each of the two abutting portions, respectively,
- one of the rod body or the cap is provided with a pair of claw portions which sandwich the other of the rod body or the cap from both outer sides of the two abutting portions,
- one of the first restricting part and the second restricting part comprises a pressing surface of the claw portion on the first direction side of the pair of the claw portions and a pressed surface of the rod body or the cap which is pressed by the pressing surface of the claw portion on the first direction side,
- the other of the first restricting part and the second restricting part comprises a pressing surface of the claw portion on the second direction side of the pair of claw portions and a pressed surface of the rod body or the cap which is pressed by the pressing surface of the claw portion on the second direction side, and
- each claw portion comprises a constriction portion which is a portion having lower rigidity than another portion of the claw portion.

* * * * *